United States Patent [19]
Ravin

[11] 3,798,794
[45] Mar. 26, 1974

[54] BLOOD PRESSURE TEACHER
[76] Inventor: Abe Ravin, 45 S. Dahlia St., Denver, Colo. 80222
[22] Filed: Nov. 13, 1972
[21] Appl. No.: 305,754

[52] U.S. Cl. ................................................. 35/17
[51] Int. Cl. ......................................... G09b 23/28
[58] Field of Search ........................................ 35/17

[56] References Cited
UNITED STATES PATENTS
3,520,071   7/1970   Abrahamson et al................... 35/17
3,564,729   2/1971   Ackerman ............................. 35/17

*Primary Examiner*—Harland S. Skogquist
*Attorney, Agent, or Firm*—C. B. Messenger

[57] ABSTRACT

An instrument for teaching techniques and refinements in taking and observing blood pressure readings and sounds. A moving indicator simulates blood pressure readings for visual observation as a speaker or stethophone output provides coordinated sounds and verbal instruction and discussion. A film projector provides visual instruction. A multi-channel tape player provides narration for the speaker as signals from the tape sequentially actuate the projector and move the blood pressure indicator in manner simulating actual observations. Auxiliary components are used to display and broadcast actual patient blood pressure readings and sounds.

23 Claims, 4 Drawing Figures

PATENTED MAR 26 1974 3,798,794

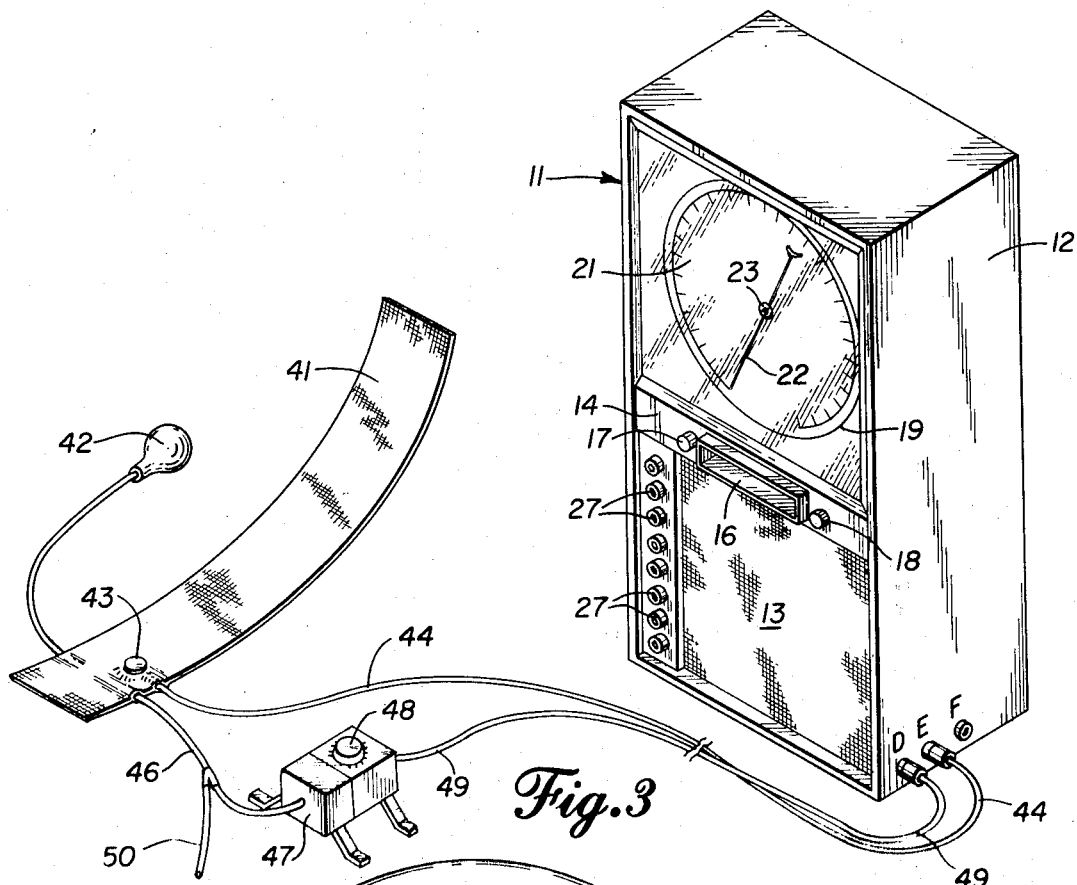
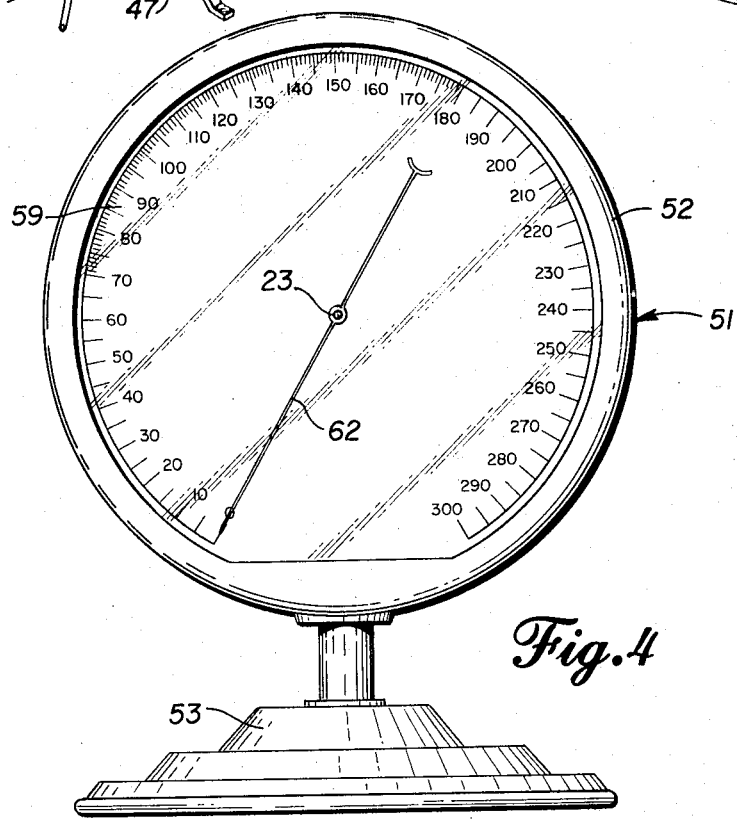

BLOOD PRESSURE TEACHER

BACKGROUND OF THE INVENTION

Throughout the world blood pressure readings are taken many times each day. Stethoscopes and stethophones are used extensively for the taking of blood pressure readings on a regular and widespread basis. Some of the persons taking blood pressure readings are not widely experienced in medicine. For some doctors and nurses the taking of blood pressure has become such a perfunctory routine that optimum information is not obtained. Actually many persons that are responsible for taking such readings have not been taught proper techniques and also do not realize the full scope of information that can be obtained from the proper taking of blood pressure readings.

The present invention is proposed for use in teaching newcomers to the medical arts some important techniques for the proper taking of blood pressure readings and in alerting such students to observations that can be made in connection with such operations. Since many of the techniques are unknown or unobserved by present practitioners and supposedly experienced paramedical people, it is expected that the apparatus will also find extensive use as a tool in connection with the re-education of such personnel.

In general previous practices have involved the instruction of individuals or small groups through actual use of blood pressure apparatus and stethoscopes or, in some instances, through instruction of groups by the use of stethophones or recordings.

SUMMARY OF THE INVENTION

The present invention provides a combination apparatus designed to present information concerning the taking of blood pressure readings through use of audio-visual techniques and components. The apparatus provides instruction on the use of components and then simulates the sounds and readings or dial movement patterns that would occur during the taking of a patient's blood pressure with sounds being simultaneously presented that correspond to actual stethoscope observations. A dial or mercury column readout is provided together with speaker or stethophone sound outlets. A cassette recording is played to provide instruction and audio sounds simulating the sounds normally heard at the time of stethophone or stethoscope observation. A multi-channel recording is used with a first channel providing the audio output, while a second channel provides a modulated signal that can be applied to a position indicating mechanism for moving the indicators of the visual display apparatus in a manner coordinated with the audio sounds. A modification of the same apparatus can be used for the actual taking of a patient's blood pressure while providing a concurrent audio and visual presentation of the results for observation by a group of students. In addition to the simulation of movements for the pressure indicating apparatus, one channel is also used to initiate and control the further visual presentation of a film strip or slide projector. Signals on a first channel of the recording tape are amplified for presentation by a speaker or at phone jacks. The modulated signals on a second channel are demodulated for use to activate and control the mechanical blood pressure indicator or to operate the projector apparatus that is used for visual instruction purposes.

Where readings are to be taken of an actual patient a blood pressure cuff is provided that has a microphone pickup that feeds to the speaker or stethophones while the actual pressure build-up in the cuff is converted by a pressure transducer to an electronic signal that can be balanced for presentation by the mechanical indicator components of the apparatus.

A separate embodiment of the invention is provided for conjoint use with components of a heart sound simulator apparatus previously invented by the same inventor and embodied in U.S. Pat. No. 3,399,467 and in copending patent application Ser. No. 305,633 filed Nov. 10, 1972.

BRIEF DESCRIPTION OF THE DRAWINGS

FIG. 3 is a perspective view showing modifications used with such embodiment for the taking of actual patient readings, and FIG. 4 is a front elevation showing the mechanical indicator apparatus used in connection with a second embodiment of the invention.

DESCRIPTION OF THE PREFERRED EMBODIMENTS

Figure 1:
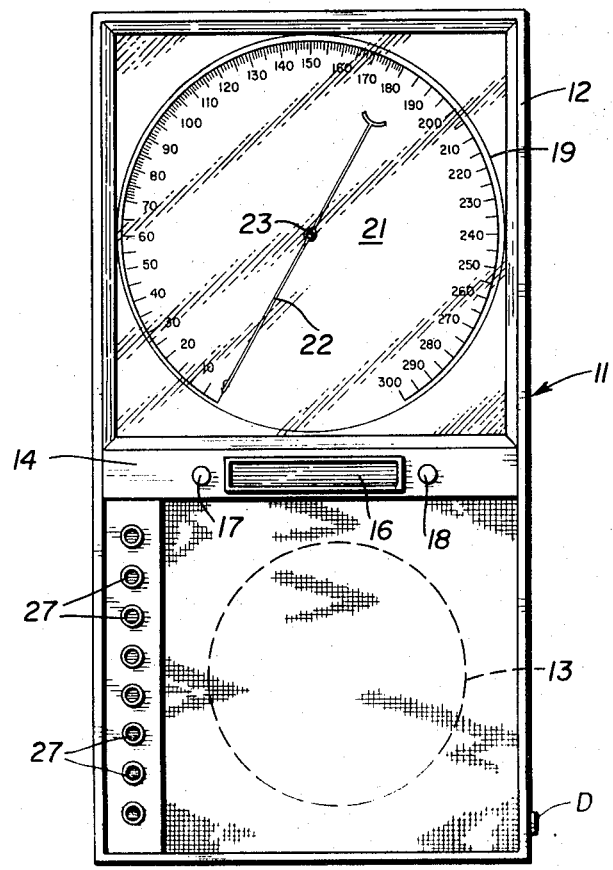
FIG. 1 is a front elevational view of apparatus made in accordance with the present invention.
Figure 2:
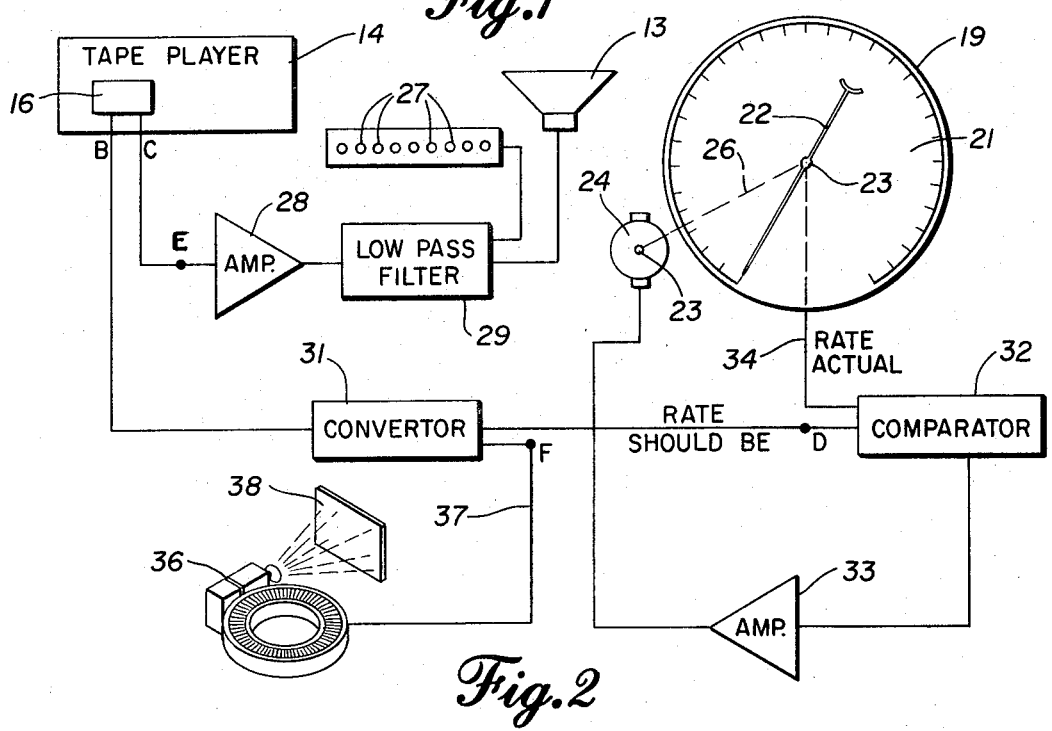
FIG. 2 is a schematic diagram illustrating components of such embodiment.

A first embodiment of the invention is shown in FIGS. 1 and 2. The apparatus here presented provides the basic components necessary for teaching the taking of blood pressure readings. The apparatus as a sale package is intended for use in medical colleges, hospitals and in other institutions where medical or paramedical personnel are to be introduced or re-educated in the taking of patient readings.

This teacher apparatus embodiment 11 provides a cabinet enclosure 12 divided into separate compartments. A lower compartment encloses a speaker 13 that is used for the presentation of audible sounds. A tape player apparatus 14 is positioned at an intermediate location. This apparatus 14 is adapted to receive a tape cassette 16, and it is, of course, inclusive of all other standard components of tape players inclusive of volume and selector controls 17 and 18. An indicator dial 19 having a face 21 marked to indicate blood pressure readings in millimeters of mercury is provided. A pointer 22 moves to selected positions about the face as regulated by a position indicator drive mechanism positioned behind the face and operative to control the movement of a pointer mounting stem 23 extending through such face. A pointer position regulating DC voltage motor 24 is shown schematically in FIG. 2 with a dash line representation 26 indicating its actual physical placement directly behing the dial face. Cabinet 12 also supports a plurality of stethophone jacks 27 into which the plugs of a plurality of students' stethophones may be connected. The cabinet additionally provides support for auxiliary jacks D, E and F that may be used for interconnecting auxiliary apparatus.

The interconnection of components and apparatus is shown schematically in FIG. 2. Here it is shown that the tape player is of multi-channel capability with a two-channel system being shown. In the system shown the recordings and output of a first channel C are all related to audio presentations. The output from such channel is delivered first to an amplifier 28 and next to a low pass filter 29 for output to the speaker 13 and/or the stethophone jacks 27. The amplifier, filter and all other components can all be conveniently housed within the cabinet 12. The channel C related apparatus is used to deliver verbal instructions selectively or conjointly to the speaker or to outlet jacks 27. This audio channel likewise provides sounds simulating the Korotkoff sounds that are heard and observed through use of a stethoscope when the blood pressure of a patient is being taken. Channel B of the tape player 14 is provided to control visual presentations that are to be made in coordinated relation with the audio presentation. The electronic signals of channel B are generally of modulated characteristic for proper tape storage and usage and such modulated tone signal is, accordingly, delivered first to a convertor 31 which will change such modulated signal to provide an output signal that is of varied amplitude, frequency, phase or voltage that can be used to actuate mechanical components used in connection with the apparatus. Such signal can be delivered to a comparator 32 and through such comparator to an amplifier 33 for application to the position indicator drive which controls movement of the pointer 22. By application of the proper signals the pointer can be moved to any selected dial position. If the taking of blood pressures is being demonstrated, the drive 24 is actuated to raise the needle to a pressure indication above the expected systolic pressure, and thereafter the pointer can be moved to successive lower positions in simulation of the release of cuff pressure influences. The signals recorded, transmitted and used are pulsed to show a bouncing of the needle as it moves to lower values in simulation of the interrupted pressure patterns actually observed on patients due to heart pulse influences. Needle movements can also be simulated that would correspond to movements that might be observed in an actual sphygmomanometer when the patient's arm or body is moved or to simulate similar pressure changes associated with the patient's breathing or other bodily functions.

In order to better regulate the needle positioning, a back-feed signal is delivered by the line 34 to the comparator 32. Such back-feed signal provides an indication of the actual needle position as distinguished from what the position should be in accordance with the then existing channel B signal. The comparator apparatus then provides a correction to bring the signal from the channel B source and the signal in line 34 into balance. A separate output from the convertor 31 can be delivered to the post F or directly to a film strip or slide projector 36. A pulsed signal in the connecting lines 37 can then be used to move the film strip or slides to successive viewing positions so that the visual presentation on viewing screen 38 can be changed in keeping with concurrent presentations from audio channel C and the information shown by the sphygmomanometer dial 19. Since many of the signals carried by channel B are of pulsed character that could be disruptive of the audio presentations of channel C, low pass filter 29 is provided to isolate such signals and to prevent any imposition thereof on the channel C presentation. A low pass filter having a limit at 1600 Hz can serve to adequately isolate the higher frequency modulated signals of channel C from the auditory outputs provided by speaker 13 or phone jacks 27.

FIG. 3 is illustrative of an auxiliary attachment for use with the apparatus of FIGS. 1 and 2. This auxiliary apparatus is to be used in connection with further instructional operations that can be separately beneficial. After the students have had opportunity to review the full scope of materials that might be presented by the tape cassette recordings, it is advantageous for the same instructional group to be able to relate the teaching materials to actual patient observations. The apparatus already described can be used to present dial readings and sounds taken from an actual patient. To provide this additional teaching benefit the auxiliary apparatus shown in FIG. 3 is provided. Such apparatus includes a blood pressure cuff 41 that may be engaged about the patient's arm to be pressurized by the conventional bulb pump 42. A microphone pickup 43 is provided in the cuff. This microphone can be positioned over arteries in the patient's arm at the usual elbow position. The microphone 43 will pick up an audible signal that is delivered by the cable 44 to the jack E. This jack E is interconnected in the audio channel C of FIG. 2 at a position shown, and, accordingly, the microphone signal will be amplified for presentation by the speaker 13 and/or the stethophone jacks 27. At the same time the pressure in the cuff 41 is delivered by the tube 46 to a pressure transducer 47 which is used to convert the cuff pressure to an electronic signal. The electronic signal is fed to a gain control component 48. This component is connected by the cable 49 to the jack D. Jack D is connected in the circuits of channel B, and, accordingly, the signal thus derived is applied to the drive 24 to actuate movements movements of the pointer 22. An auxiliary pressure tube 50 from the cuff 41 can be interconnected to the usual sphygmomanometer to provide a standard or base to which the position of pointer 22 can be related. When the cuff pressure is observed at the sphygmomanometer, adjustments can be made in the gain control apparatus 48 to coordinate the positioning of the pointer 22 with the actual pressure readings on the sphygmomanometer. When such readings are properly coordinated, the dial 19 will show the actual patient readings as the taking of blood pressure proceeds. A group of observers are thus enabled to make a conjoint observation of coordinated pressures and sounds as the actual patient readings are taken. The thus observed readings can be discussed, and any improper procedures used in this actual demonstration of technique can be discussed and corrected.

FIG. 4 presents a separate embodiment of the invention that is particularly adapted for conjoint use with the heart sound simulator apparatus disclosed in the mentioned patent and application. For this display unit of the invention 51 many of the previously described components are housed within indicator housing 52. A support base 53 holds the housing 52 in upright position so that the dial indicator components 59 which are of larger size than the dial 19 can be observed by a group of greater size. The pointer 62 is again rotated by a central stem. This stem can be the same as the stem 23 previously described. The drive 24, signal amplifier 33 and comparator 32 can be disposed within the housing 52. All the remaining components shown in FIGS. 1 and 2 are common to components already used in the heart sounds teaching display unit shown and disclosed in the mentioned application. Accordingly, the output from such components can be delivered to the display unit 51 for group observation. For this particular embodiment of the invention the display unit 51 becomes in essence an auxiliary to the heart sound simulator apparatus disclosed in the copending application. When such display unit is used with this type apparatus, additional teaching benefits can be derived, since the blood pressure signal shown by the pointer 62 and the movements of such pointer can then be coordinated with electrocardiogram displays as well as with the heart sounds that are presented by the sound simulation apparatus disclosed in such application.

The actual positioning of the pointer 22 is regulated by the drive 24. Drive 24 can be a DC motor actuated or controlled to move the pointer as required, or such drive could incorporate Selsyn, phase shift or other types of remote position indicating or Servo system components. Any of such drive components can be used so long as the control signals therefor can be recorded and stored for use by play-back types of apparatus. Since the actual signals may not be directly recordable, the use of modulator-demodulator circuits is contemplated.

Obviously the signals preserved and presented by the tape player or other play-back apparatus are previously prepared by additional apparatus. Such additional apparatus is inclusive of necessary audio equipment to prepare the channel C materials. Microphone pickups can also be used to provide a recording of the Korotkoff sounds that are heard when blood pressure readings are being taken. Since, however, it would be difficult to locate all of the various patients for the recording of all normal and abnormal sounds, the present inventor uses the heart sound simulator apparatus described in the mentioned earlier patent and copending application. Selected channels of this type of apparatus can be used to simulate all of the Korotkoff sounds that might be observed in a wide variety of patients.

Apparatus such as that shown in FIGS. 1 and 2 can be used in connection with the establishment of signals that will be related to the positioning of the pointer. The feed-back signals of the drive 24 regularly generated for delivery to comparator 32 can be used to provide the original signals on the recorded tape. The pointer is manually moved to the desired pressure ranges for subsequent return to lower pressure readings in simulation of the decaying pressure of a blood pressure cuff as readings are to be taken. As the pointer is manually moved, changed signals will be successively generated that can be modulated for recording on channel B of a tape cassette. The signals that are thus generated can even simulate the minor pressure fluctuations noted due to patient pulse influences. If the pointer is moved along a decaying pressure path with a bouncing movement, the output signal will be similarly disturbed. When the tape is replayed, the pointer 22 will be similarly moved in a bouncing pattern. Other abnormalities in observed pressure readings can likewise be simulated by manual manipulation of the signal generating apparatus. Once a tape has been recorded that will present all of the necessary signal information for both channels B and C, duplicate recorded copies can be made for later use on many separate display units such as the described embodiments 11 and 51.

I claim

1. Apparatus presenting sounds and visual material for use in teaching the taking of blood pressure comprising a first visual display unit for the presentation of pressure readings, a moving indicator for said display unit, sound output means for the presentation of instructional material and sounds characteristic of blood pressure reading operations, a recorded program element preserving sound related signals for application to said sound output means and operator signals for controlling the movement patterns of said indicator, and means for the coordinated presentation of said signals to provide audio and visual instruction for making blood pressure observations.

2. The apparatus of claim 1 wherein said display unit provides a face with pressure readings indicated in millimeters of mercury.

3. The apparatus of claim 2 wherein said moving indicator is a pointer.

4. The apparatus of claim 1 wherein said sound output is a speaker.

5. The apparatus of claim 4 wherein a plurality of sound output means are provided.

6. The apparatus of claim 5 wherein said sound output means is inclusive of a speaker and phone outlets.

7. The apparatus of claim 1 wherein separate recordings are provided for said sound and operator signals and further comprising separate pickup means for said separate recordings.

8. The apparatus of claim 7 wherein said separate recordings are conjointly played for the coordination of said signals.

9. The apparatus of claim 7 wherein a multichannel tape is used as said recorded program element with said sound and operator signals being applied to separate channels thereof.

10. The apparatus of claim 9 and further comprising a tape player as said coordinated presentation means.

11. The apparatus of claim 1 and further comprising drive means interconnected to said display unit indicator.

12. The apparatus of claim 11 wherein said drive means is of remote position indicating type with said operator signals being effective to control the position of said means and indicator.

13. The apparatus of claim 12 wherein said drive means is a motor for actuation by said operator signals.

14. The apparatus of claim 1 and further comprising a projector component providing a second visual display.

15. The apparatus of claim 14 wherein said projector component is interconnected for reception of said operator signals and further comprising means for changing the serial presentations of said projector in response to said operator signals.

16. The apparatus of claim 1 and further comprising auxiliary components for direct application to a patient, and means interconnecting said components to said apparatus whereby blood pressure readings and sounds derived from the patient are presented by said display unit and sound output means.

17. The apparatus of claim 16 wherein said auxiliary components are inclusive of a blood pressure cuff and a pickup microphone for application to surfaces of a patient's body.

18. The apparatus of claim 17 wherein said auxiliary components are inclusive of a pressure transducer for changing the pressure in said cuff to an electronic signal for application to said display unit.

19. The apparatus of claim 18 wherein said auxiliary components are inclusive of a gain control element for adjusting the signals derived from said blood pressure cuff and transducer for introduction to said apparatus.

20. The apparatus of claim 19 wherein said components are inclusive of a connector tube for application to a conventional sphygmomanometer whereby the readouts of said display unit indicator and the sphygmomanometer can be balanced.

21. In apparatus for the simulation of heart sounds and inclusive of sound output means for the presentation of instructional materials and of sounds characteristic of blood pressure reading operations, a visual display unit for the presentation of pressure readings, a moving indicator for said display unit, and a recorded program element preserving sound related signals for application to said sound output means and operator signals for controlling the movement patterns of said indicator.

22. Apparatus as set forth in claim 21 and further comprising a tape player and speaker outlets for said sound output means.

23. The apparatus as set forth in claim 21 and further comprising drive means of remote position indicating type interconnected to the indicator of said display unit with said operator signals being effective to control the position of said drive means and indicator.

* * * * *